(No Model.)

J. E. ROGERS.
JOURNAL BEARING FOR TRUCKS.

No. 592,665. Patented Oct. 26, 1897.

WITNESSES:
M. S. Blondel
Jos. A. Ryan

INVENTOR
John E. Rogers.
BY Munn & Co.
ATTORNEYS.

UNITED STATES PATENT OFFICE.

JOHN ERNEST ROGERS, OF DENDRON, VIRGINIA.

JOURNAL-BEARING FOR TRUCKS.

SPECIFICATION forming part of Letters Patent No. 592,665, dated October 26, 1897.

Application filed August 4, 1897. Serial No. 647,136. (No model.)

*To all whom it may concern:*

Be it known that I, JOHN ERNEST ROGERS, of Dendron, in the county of Surry and State of Virginia, have invented a new and Improved Journal-Bearing for Trucks, of which the following is a specification.

My invention is a journal box or bearing applicable to small trucks in general, and especially to dry-kiln trucks. As is well known to those using the latter, the wooden side beams in which the journals of the transporting-wheels have their bearings are liable to split lengthwise in consequence of the weight of the truck and the load being sustained by only half of the thickness and strength of such beams.

My improved bearing is so constructed as to apply such upward pressure to the entire width of the beams that their entire strength is utilized and splitting of the same thereby avoided.

The bearing is likewise so constructed that it is held in place without the aid of screws, bolts, nails, or other supplementary fastenings, and in order to provide for its application to the side beams of a truck it is only necessary to bore a hole in the inner face of the beams and then force the bearing to place, which it retains by friction with the wood and the end thrust of the wheel-axle.

Figure 1:
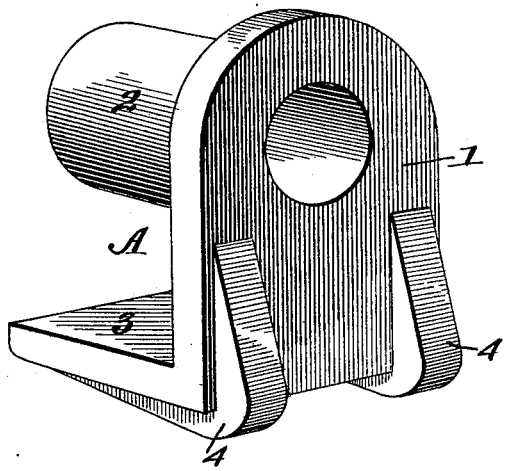
Figure 2:
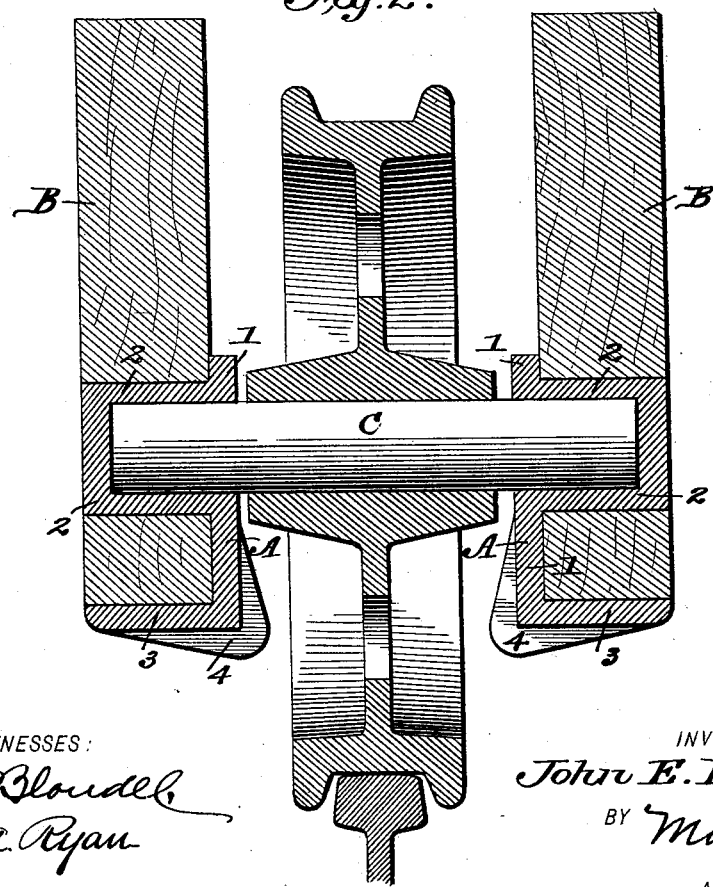

In the accompanying drawings, Figure 1 is a perspective view of my improved bearing; and Fig. 2 is a vertical section of a portion of a dry-kiln truck, showing the bearing applied as in practical use.

The bearing A is constructed of a body or face-plate 1, a cylindrical journal socket or box proper, 2, which projects laterally from such body 1 and is closed at its outer end, and a lip or flange 3, which is arranged beneath and parallel to said box, the whole being formed integrally and preferably of cast metal.

In order to apply the bearing to the side beams B of a truck, a two-inch hole is bored in the inner face of each beam at a distance from the lower edge of the latter which just equals the space between the box 2 and flange 3. The box 1 is then forced into such bore, which it fits snugly, and the lip or flange 3 embraces and presses firmly against the lower edge of the beam, as shown in Fig. 2.

It will be seen that the flange 3, which has the same width as the body or face-plate 1, furnishes a broad flat bearing on the under side of the truck-beams B, and that most of the weight imposed on the wheel-axle is sustained by it, so that the beams are not liable to split, as would be the case were the flange absent and the box 2 left to perform the same function alone.

The cylinder or box 2 fits somewhat closely in the bore in the first instance, and the wood subsequently closes still more tightly around it by its own inherent resiliency or expansive quality, so that the bearing A is kept in place without supplemental aids. Further, this result is practically aided by the end thrust of the wheel-axle C, which abuts the closed outer ends of the opposite boxes 2.

As a means of strengthening and bracing the bearing A at its angle I provide it with bosses or buttresses 4, as shown.

What I claim is—

1. As an improved article of manufacture, the detachable journal-bearing for trucks, which comprises a vertical face-plate, the lateral, tubular journal-socket, or box, 2, and the lip or flange 3, arranged beneath and parallel to said box, as shown and described.

2. The improved journal-bearing for trucks, which consists of the body, or face-plate, the cylindrical box projecting laterally from such body and having its outer end closed, and the broad base lip or flange, projecting laterally from the lower edge of said plate, parallel to the box, all constructed integrally of cast metal, as shown and described.

3. The combination with the opposite truck side beams, having transverse bores, and the wheel and axle as shown, of the journal-bearings having lateral boxes which fit in said bores and closed outer ends, and the broad horizontal flanges, which embrace or press against the under side of the beams, as shown and described.

JOHN ERNEST ROGERS.

Witnesses:
   WILLIAM ELDRED,
   ANSELM BAILEY URQUHART, Jr.